(12) United States Patent
Kadoma et al.

(10) Patent No.: US 11,260,632 B2
(45) Date of Patent: Mar. 1, 2022

(54) LACTIC ACID POLYMER FILMS

(71) Applicant: 3M INNOVATIVE PROPERTIES COMPANY, St. Paul, MN (US)

(72) Inventors: Ignatius A. Kadoma, Cottage Grove, MN (US); Stewart W. Campbell, St. Paul, MN (US); David M. Peterson, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 141 days.

(21) Appl. No.: 15/764,451

(22) PCT Filed: Sep. 29, 2016

(86) PCT No.: PCT/US2016/054548
§ 371 (c)(1),
(2) Date: Mar. 29, 2018

(87) PCT Pub. No.: WO2017/059138
PCT Pub. Date: Apr. 6, 2017

(65) Prior Publication Data
US 2018/0272668 A1 Sep. 27, 2018

Related U.S. Application Data

(60) Provisional application No. 62/234,114, filed on Sep. 29, 2015.

(51) Int. Cl.
| | | |
|---|---|---|
| *B32B 27/08* | (2006.01) |
| *B32B 27/36* | (2006.01) |
| *B32B 27/22* | (2006.01) |
| *B32B 27/06* | (2006.01) |
| *C08K 5/11* | (2006.01) |
| *C08K 5/00* | (2006.01) |
| *B32B 27/26* | (2006.01) |
| *C08G 63/08* | (2006.01) |
| *C08L 67/04* | (2006.01) |

(52) U.S. Cl.
CPC .............. *B32B 27/08* (2013.01); *B32B 27/06* (2013.01); *B32B 27/22* (2013.01); *B32B 27/26* (2013.01); *B32B 27/36* (2013.01); *C08G 63/08* (2013.01); *C08K 5/0016* (2013.01); *C08K 5/11* (2013.01); *C08L 67/04* (2013.01); *B32B 2250/24* (2013.01); *B32B 2250/244* (2013.01); *B32B 2250/44* (2013.01); *B32B 2307/412* (2013.01); *B32B 2307/50* (2013.01); *B32B 2307/7163* (2013.01); *B32B 2307/732* (2013.01); *B32B 2553/00* (2013.01)

(58) Field of Classification Search
CPC ......... C08L 67/04; C08K 5/0016; C08K 5/11; B32B 2250/24; B32B 2250/244; B32B 2250/44; B32B 2307/412; B32B 2307/50; B32B 2307/7163; B32B 2307/732; B32B 2553/00; B32B 27/06; B32B 27/08; B32B 27/22; B32B 27/26; B32B 27/36; C08G 63/08
See application file for complete search history.

(56) References Cited

U.S. PATENT DOCUMENTS

| | | | | |
|---|---|---|---|---|
| 5,849,401 A | * | 12/1998 | El-Afandi | B32B 27/08 428/215 |
| 6,114,495 A | * | 9/2000 | Kolstad | C08G 63/90 525/413 |
| 2007/0160782 A1 | | 7/2007 | Yatsuzuka | |
| 2009/0169851 A1 | | 7/2009 | Busch | |
| 2009/0179069 A1 | | 7/2009 | Schmidt | |
| 2009/0324917 A1 | | 12/2009 | Wang | |
| 2010/0183834 A1 | | 7/2010 | Stark | |
| 2010/0240833 A1 | | 9/2010 | Sakurai | |
| 2011/0135912 A1 | | 6/2011 | Xu | |
| 2011/0200844 A1 | | 8/2011 | Fayne | |
| 2011/0272832 A1 | | 11/2011 | Neavin | |
| 2011/0272849 A1 | | 11/2011 | Neavin | |
| 2012/0016328 A1 | | 1/2012 | Shi | |
| 2013/0331493 A1 | * | 12/2013 | Yamamura | C08J 5/18 524/145 |
| 2014/0162038 A1 | | 6/2014 | Riebel | |

FOREIGN PATENT DOCUMENTS

| | | |
|---|---|---|
| JP | 2003-191425 | 7/2003 |
| JP | 2004-090608 | 3/2004 |
| JP | 2004-143432 | 5/2004 |
| JP | 2004-358845 | 12/2004 |
| JP | 2005-144694 | 6/2005 |
| JP | 2008-221733 | 9/2008 |
| JP | 2008-221809 | 9/2008 |
| JP | 2008-221811 | 9/2008 |
| JP | 2008-265115 | 11/2008 |
| JP | 2008-265118 | 11/2008 |
| JP | 5003222 | 8/2012 |
| JP | 5092521 | 12/2012 |
| JP | 5309456 | 10/2013 |
| JP | 5374826 | 12/2013 |
| JP | 2014-005330 | 1/2014 |

OTHER PUBLICATIONS

Ueki et al. (JP 5092521 B2), May 12, 2012. (Year: 2012).*
International Search report for PCT International Application No. PCT/US2016/054548 dated Dec. 15, 2016, 2 pages.

* cited by examiner

*Primary Examiner* — Lawrence D Ferguson
(74) *Attorney, Agent, or Firm* — 3M Innovative Properties Company

(57) ABSTRACT

A multilayer film comprises (a) two or more non-plasticized layers comprising lactic acid polymer and (b) one or more plasticized layers comprising lactic acid polymer and plasticizer sandwiched between the two or more lactic acid polymer layers; wherein the thickness of the one or more plasticized layers comprises from about 60% to about 70% of the total thickness of the multilayer film.

10 Claims, No Drawings

LACTIC ACID POLYMER FILMS

FIELD

This invention relates to lactic acid polymer films and articles made therefrom.

BACKGROUND

Traditionally packaging and shipping materials have been made from films based on fossil feed stocks. In recent years, bio-plastics and degradable polymers have received increased attention. Packaging and shipping materials based upon bio-plastics typically suffer from weak film strength and other problems.

SUMMARY

In view of the foregoing, we recognize that there is a need in the art for biodegradable films with high renewable content that are well suited for packaging and shipping applications.

The present invention provides films of plasticized and non-plasticized lactic acid polymer layers. The multilayer films are well suited for packaging and shipping applications such as, for example, envelopes, gift bags, void fills, freezer paper, package filler papers, garbage bags and the like. The films are biodegradable and may also exhibit properties such as, for example, rigidity, flexibility, water resistance, transparency, tear resistance, puncture resistance, paper feel, writability/printability and/or softness depending upon the desired packaging or shipping application.

Briefly, in one aspect, the present invention provides a multilayer film comprising (a) two or more non-plasticized layers comprising lactic acid polymer, and (b) one or more plasticized layers comprising lactic acid polymer and plasticizer sandwiched between the two or more lactic acid polymer layers; wherein the thickness of the one or more plasticized layers comprises from about 60% to about 70% of the total thickness of the multilayer film.

In another aspect, the present invention provides A multilayer film comprising (a) two or more non-plasticized layers comprising lactic acid polymer, and (b) one or more plasticized layers comprising lactic acid polymer and plasticizer sandwiched between the two or more lactic acid polymer layers; wherein the one or more plasticized layers comprises from about 22.5 wt. % to about 25 wt. % plasticizer.

In yet another aspect, the present invention provides multilayer film comprising (a) one or more non-plasticized layers comprising lactic acid polymer and starch, and (b) one or more plasticized layers comprising lactic acid polymer and plasticizer.

In still another aspect, the present invention provides void fill articles comprising a bent multilayer film comprising (a) two or more non-plasticized layers comprising lactic acid polymer, and (b) one or more plasticized layers comprising lactic acid polymer and plasticizer sandwiched between the two or more lactic acid polymer layers.

DETAILED DESCRIPTION

The multilayer films of the invention comprise plasticized and non-plasticized lactic acid polymer layers. As used herein, "lactic acid polymers" are any polymers that primary building unit (i.e., monomer) is lactic acid. Useful polylactide (PLA) polymers include, for example, PLA NatureWorks™ 4032D and PLA 4060D. In some embodiments, the lactic acid polymers have a weight-average molecular weight of about 110,000 g/mol to about 250,000 g/mol or about 150,000 g/mol to about 180,000 g/mol.

In some bi-layer embodiments of the invention, one layer might be mostly crystalline while the other layer might be mostly amorphous. In some tri-layer embodiments of the invention, a mostly crystalline layer might be sandwiched between two mostly amorphous layers.

In some bi-layer embodiments of the invention, one layer might comprise plasticizer ("plasticized layer") while the other layer does not comprise plasticizer or comprises very little plasticizer ("non-plasticized layer") such as, for example, less than about 2 wt. %. In some tri-layer embodiments of the invention, a plasticized layer might be sandwiched between two non-plasticized layers. Other multilayer constructions are also possible. Preferably, one or more plasticized layers are sandwiched between non-plasticized layers.

Plasticized layers can, for example, provide desirable properties such as increased flexibility and puncture and tear resistance. Any useful plasticizer can be used. Preferably, bio-based plasticizer are utilized. As used herein, the term "bio-based" means based in whole or in significant part of renewable materials. Examples of useful bio-based plasticizers include SGP9300D plasticizer from Segetis (Golden Valley, Minn.) and Citroflex™ A-4 (acetyl tributyl citrate) plasticizer from Vertellus Specialties (Indianapolis, Ind.). In some embodiments, plasticized layers comprise from about 22.5 wt. % to about 30 wt. % plasticizer, from about 23 wt. % to about 25% plasticizer, or from about 24 wt. % to about 25 wt. %. It has been discovered that at up to about 25 wt. % plasticizer, there is little migration of the plasticizer into other layers.

In some tri-layer embodiments of the invention, the layer thickness ratio (i.e., non-plasticized layer thickness:plasticized layer thickness:non-plasticized layer thickness) is about 1:1:1 to about 1:4.5:1. The preferred layer thickness ratio will depend, however, on desired properties and end application of the film. If, for example, the film is to be used for envelopes or applications where flexibility is desirable, a layer thickness ratio of about 1:3:1 to about 1:4.5:1, or about 1:4:1, can be preferred. If, for example, the film is to be used for a gift bag, void fill article or other applications where some flexibility is needed for folding but rigidity is also needed to support weight, a layer thickness ratio of about 1:1:1 to about 1:3:1, or about 1:2:1, can be preferred.

In some embodiments of the invention wherein one or more plasticized layers are sandwiched between two or more lactic acid polymer layers, the thickness of the one or more plasticized layers comprises from about 30% to about 70% of the total thickness of the multilayer film. If, for example, the film is to be used for applications where flexibility is desirable, it can be preferred that the thickness of the one or more plasticized layers comprises from about 60% to about 70% of the total thickness of the multilayer film. If, for example, the film is to be used for applications where some flexibility is needed for folding but rigidity is also needed to support weight, it can be preferred that the thickness of the one or more plasticized layers comprises from about 30% to about 50% of the total thickness of the multilayer film.

In some embodiments, the multilayer films of the invention comprise only bio-based polymers. In some embodiments, the multilayer films of the invention are biodegradable and compostable. As used herein, "biodegradable" means that the films meet the requirements of ASTM D6400-12.

The PLA multilayer films of the invention can be made transparent or with colorants or pigments such as carbon black, titanium dioxide or the like.

As mentioned above, PLA multilayer films of the invention can be used to make void fill articles. The PLA multilayer films of the invention can be bent or folded into a desired three dimensional shape to provide void fill in shipping boxes. Void fill articles made from the multilayer films of the invention can provide several advantages over traditional void fill materials. For example, void fill articles of the invention are biodegradable and water-resistant. They can also be transparent so that the item packed in the box is visible within through the void fill. As used herein, "transparent" means that the multilayer film allows light to pass through so that objects behind can be distinctly seen.

If a PLA multilayer film with a paper-like look and feel is desired, starch can be added to non-plasticized outer layers. The starch also helps with adhesion to tape and writability/printing. One application in which these properties are desirable is freezer paper. In some embodiments, one or both outer layers of the film comprises from about 5 wt. % to about 20 wt. % starch based upon the total weight of the layer. Examples of suitable starches include native starches, reclaimed starches, waxy starches, modified starches, pre-gelatinized starches, or combinations thereof. Modified starches can include acid-treated starch, alkaline-treated starch, bleached starch, oxidized starch, enzyme-treated starch, monostarch phosphate, distarch phosphate, phosphated distarch phosphate, acetylated distarch phosphate, starch acetate, acetylated distarch adipate, dextrin, cyclodextrin, hydroxypropyl starch, hydroxypropyl 15 distarch phosphate, hydroxypropyl distarch glycerol, starch sodium octenyl succinate, acetylated oxidized starch, and combinations thereof.

EXAMPLES

Objects and advantages of this invention are further illustrated by the following examples, but the particular materials and amounts thereof recited in these examples, as well as other conditions and details, should not be construed to unduly limit this invention.

In the following examples, the samples are identified by the thickness of the film and the intended application, where 1 mil equals one thousandth of an inch, or 25.4 micrometers.

Overview of Examples

| Example number | Description | Line speed, feet/minute (fpm) | Layer thickness ratio | Die or feedblock (FB) |
|---|---|---|---|---|
| 1 | 2 mil envelope | 101 | [1:4:1] | 3 layer die |
| 2A | 4 mil gift bag | 112 | [1:2:1] | single layer die/FB |
| 2B | 5 mil gift bag | 90 | [1:2:1] | single layer die/FB |
| 3A | 8 mil void fill film | 56 | [1:2:1] | single layer die/FB |
| 3B | 10 mil void fill film | 43 | [1:2:1] | single layer die/FB |
| 4 | 5 mil freezer paper | 13.5 | [1:2:1] | single layer die/T FB |
| Comparative of 4 | 5 mil PLA-4032 (3-layer) | 13.5 | [1:2:1] | single layer die/T FB |

Materials Used

| Materials | Trade Designation | Generic description | Supplier | Supplier Headquarters | Layer used |
|---|---|---|---|---|---|
| PLA-4032 | Ingeo Bioplastics 4032D | Biodegradable polylactic acid resin | NatureWorks | Minnetonka, MN | MIDDLE AND SKIN LAYER, EX. 1-3B |
| PLA-4060 | Ingeo Bioplastics 4060D | Biodegradable polylactic acid resin | NatureWorks | Minnetonka, MN | MIDDLE, EX. 1, MIDDLE AND SKIN LAYER, EX. 4 |
| White Master Batch, PLA-4032/TIO$_2$(60/40) | PLA WHITE MASTERBATCH | Biodegradable polylactic acid resin compounded with Titanium Dioxide pigment | Clariant | Minneapolis, MN | MIDDLE AND SKIN LAYER, EX. 1 |
| Black Master Batch, PLA-4032/CARBON BLACK(85/15) | PLA BLACK MASTERBATCH | Biodegradable polylactic acid resin compounded with carbon black pigment | Clariant | Minneapolis, MN | SKIN LAYER, EX. 1 |
| Modified starch | SR-088 | Starch | Glycan BioTechnology Co. | Taoyuan, Taiwan | SKIN LAYER, EX. 4 |
| Citroflex A4 | Citroflex ® A-4 Plasticizer | Bio-based plasticizer | Vertellus | Indianapolis, IN | MIDDLE LAYER, EX. 1, 4 |
| Segetis | SGP9300D | Bio-based plasticizer | Segetis Inc. | Golden Valley, MN | MIDDLE LAYER, EX. 2A, 2B, 3A, 3B |

Symmetric (ABA) or asymmetric (ABC) 3-layer films were produced by the processes described below, using the compositions for the outer skin (A) layer, core (B) layer, and inner skin (A or C) layer compositions listed in Table A.

TABLE A

| Example | Description | Outer Skin | | | | Core | | | |
| --- | --- | --- | --- | --- | --- | --- | --- | --- | --- |
| | | % PLA-4032 | % PLA-4060 | % White Master Batch | Modified starch | % PLA 4032 | % PLA 4060 | % Citroflex A4 | % Segetis |
| 1 | 2 mil envelope | 75 | 0 | 25 | 0 | 37 | 28 | 25 | 0 |
| 2A | 4 mil gift bag | 100 | 0 | 0 | 0 | 75 | 0 | 0 | 25 |
| 2B | 5 mil gift bag | 100 | 0 | 0 | 0 | 75 | 0 | 0 | 25 |
| 3A | 8 mil void fill | 100 | 0 | 0 | 0 | 75 | 0 | 0 | 25 |
| 3B | 10 mil void fill | 100 | 0 | 0 | 0 | 75 | 0 | 0 | 25 |
| 4 | 5 mil freezer paper | 0 | 70 | 0 | 30 | 0 | 80 | 20 | 0 |
| Comparative Example | | 100 | 0 | 0 | 0 | 100 | 0 | 0 | 0 |

| Example | Description | Core | Inner Skin | | | | | Caliper, mils | Layer ratio |
| --- | --- | --- | --- | --- | --- | --- | --- | --- | --- |
| | | % White Master Batch | % PLA-4032 | % PLA-4060 | % White Master Batch | % Black Master Batch | % Mod Starch | | |
| 1 | 2 mil envelope | 10 | 84 | 0 | 12 | 4 | 0 | 2 | [1:4:1] |
| 2A | 4 mil gift bag | 0 | 100 | 0 | 0 | 0 | 0 | 4 | [1:2:1] |
| 2B | 5 mil gift bag | 0 | 100 | 0 | 0 | 0 | 0 | 5 | [1:2:1] |
| 3A | 8 mil void fill | 0 | 100 | 0 | 0 | 0 | 0 | 8 | [1:2:1] |
| 3B | 10 mil void fill | 0 | 100 | 0 | 0 | 0 | 0 | 10 | [1:2:1] |
| 4 | 5 mil freezer paper | 0 | 0 | 70 | 0 | 0 | 30 | 5 | [1:2:1] |
| Comparative Example | | 0 | 100 | 0 | 0 | 0 | 0 | 5 | [1:2:1] |

Example 1

Samples for the 3-layer film (ABC) described in Example 1 were prepared by compounding the desired ingredients in the ratios described in Table A using three extruders: a 50 mm co-rotating twin screw extruder (Coperion, Weingarten, Germany) feeding layer "B"; a 40 mm co-rotating twin screw extruder (Coperion, Weingarten, Germany) feeding layer "A" and a 40 mm co-rotating twin screw extruder (Coperion, Weingarten, Germany) feeding layer "C". The plasticizer was injected into zone 3 of the 50 mm co-rotating twin screw using a DynaMelt™ SR2027GD2 (ITW DynaTech, Hendersonville, Tenn.). The layers of the final film construction were formed in a multi-manifold die similar to the ones described in co-owned U.S. patent applications 2011/0272849, FEEDBLOCK FOR MANUFACTURING MULTILAYER POLYMERIC FILMS and 2011/0272832, APPARATUS FOR MANUFACTURING MULTILAYER POLYMERIC FILMS, herein incorporated by reference. Each material entered the die through independent inlets and feed flow channels that were specific to that material. These channels form a conduit between the inlet and a layer spreading manifold. Each manifold spreads its particular material to the full width of the die. The downstream section of each manifold feeds a slot-like channel. The geometry of the manifold and slot section substantially contribute to the cross web uniformity of each layer. For the 3 layer system, there were 3 slots that conveyed the independent streams to a point of confluence where the layers were combined. The combined streams formed a layer structure in which each layer was generally parallel with a plane running across the width of the die. This combined layer structure was then fed through a common channel that runs across the full width of the die and extends to the exit of the die. This common channel typically varies in height, with the channel being larger at the point of confluence and narrowing as it gets nearer to the die exit.

Examples 2A, 2B, 3A, and 3B

Samples for the 3-layer film (ABA) described in Example 2A, 2B, 3A, and 3B were prepared by compounding the desired ingredients in the ratios described in Table A using three extruders: a 58 mm co-rotating twin screw extruder (Davis Standard, Pawcatuck, Conn.) feeding layer "B"; a 2.5 inch (6.35 cm) single screw extruder (Davis Standard, Pawcatuck, Conn.) feeding layer "A" and another 2.5 inch single screw extruder (Davis Standard, Pawcatuck, Conn.) feeding layer "C", which was a duplicate of layer "A". The plasticizer was injected into zone 3 of the 58 mm co-rotating twin screw using a DynaMelt M 35 series (ITW DynaTech, Hendersonville, Tenn.). The 3-layer film production processes for Examples 2, 3, & 4 were similar to the process for Example 1, except that the layers were combined in a feedblock and then spread as a unit to the full width in a single manifold die.

Example 4

Samples for the 3-layer film (ABA) described in Example 4 were prepared by compounding the desired ingredients in the ratios described in Table A using two extruders: a 25 mm co-rotating Berstoff Twin screw extruder (KraussMaffei Technologies GmbH, Munich, Germany) feeding layer "A" and a 27 mm co-rotating Leistritz Twin screw extruder (LEISTRITZ AG, Nuremberg, Germany) feeding layer "B". The plasticizer was injected into zone 3 of the 27 mm co-rotating twin screw using a DynaMelt SR5N2ZES12-A (ITW DynaTech, Hendersonville, Tenn.). The 3-layer film production processes for Example 4 was similar to the process for Example 1, except that the layers were combined in a feedblock and then spread as a unit to the full width in a single manifold die. The resulting three layer ABA film was cast onto an 8-inch wide casting wheel held at 80° F. and running at 13.5 feet per minute (4.11 meters/minute).

Comparative Example

A comparative example of pure PLA-4032 was made in the exact manner as Example 4 except that pure PLA-4032 was fed to each of the two extruders. Extruder throughputs in the table below are expressed in pounds per hour (lb/hr), where 1 lb/hr equals 0.45 kg/hr.

Process Conditions

| Example number | Description | Layer ratio | Outer skin throughput, lb/hr | Throughput, core, lb/hr | Inner skin throughput lb/hr | Outer skin melt temp, degrees F. | Core Melt Temperature, degrees F. | Inner skin, melt temperature degrees F. | Die Temperature, degrees F. | Line speed, fpm | Die or feed block(FB) |
|---|---|---|---|---|---|---|---|---|---|---|---|
| 1 | 2 mil envelope | [1:4:1] | 15 | 60 | 15 | 405 | 365 | 405 | 420 | 101 | 3 layer die |
| 2A | 4 mil gift bag | [1:2:1] | 100 | 200 | 100 | 430 | 407 | 473 | 430 | 112 | single layer die/FB |
| 2B | 5 mil gift bag | [1:2:1] | 100 | 200 | 100 | 430 | 407 | 473 | 430 | 90 | single layer die/FB |
| 3A | 8 mil void fill | [1:2:1] | 100 | 200 | 100 | 430 | 407 | 473 | 430 | 56 | single layer die/FB |
| 3B | 10 mil void fill | [1:2:1] | 100 | 200 | 100 | 430 | 407 | 473 | 430 | 43 | single layer die/FB |
| 4 | 5 mil freezer paper | [1:2:1] | 5 | 10 | 5 | 435 | 410 | 435 | 420 | 13.5 | single layer die/T FB |
| Comparative Example | | [1:2:1] | 5 | 10 | 5 | 435 | 410 | 435 | 420 | 13.5 | single layer die/T FB |

Test Results

| | Test Methods (ASTM #): | | | | |
|---|---|---|---|---|---|
| Patent Example # | ASTM E-252 Nominal Caliper, mils | ASTM D1922-09 MD Elmendorf Tear, N | ASTM D1922-09 CW Elmendorf Tear, N | ASTM D3763-14 Impact by falling dart, energy dissipated, J | ASTM D3763-14 Impact by falling dart, peak force, N |
| 1 | 2 | 7.9 | 14.1 | 0.5372 | 63.204 |
| 2A | 4.5 | 2.8/6.1 | 3.1/6.6 | 0.19206 | 60.44 |
| 2B | 5.3 | 2.7 | 5.1 | N/A | N/A |
| 3A | 8 | 4.7/5.9 | 6.9/10.0 | 0.13883 | 120.92 |
| 3B | 10 | 7.4 | 10.4 | 0.12343 | 163.45 |
| 4 | 5 | 2.1 | 2.2 | 0.16835 | 50.544 |
| Comparative example | 5 | 1.5 | 1.5 | 0.10395 | 41.6 |
| PLA-4032 | 5 | 0.83 | 0.69 | | |

The table above includes the results of two tests for Elmendorf Tear in both the machine direction (MD) and cross-web direction (CW) for Examples 2A and 3A. No samples of film 2B were available for falling dart testing (ASTM D3763-14.) Elmendorf Tear Strength values for a 5 mil (127 micrometer) thick PLA-4032 film are calculated from the following NatureWorks Ingio™ website data.
Elmendorf Tear Strength, MD 0.669 g/micron ASTM D1922
Elmendorf Tear Strength, TD 0.551 g/micron ASTM D1922
Falling Dart Impact Tests, ASTM D3763-14

Impact puncture properties were measured for five film samples according to ASTM D3763-14. Both peak force and energy dissipated at peak force were evaluated. Example 1 exhibited the highest energy dissipation, while Example 3B exhibited the highest peak force. Example 3B also exhibited one of the lowest energy dissipations, indicating that more compliant systems may exhibit higher levels of toughness.

Sample Description:
Film Rolls:
  Comparative Example
  Example 1
  Example 2A
  Example 3A
  Example 3B
  Example 4
Data:

TABLE 1

Summary of energy dissipated for each film sample.

| Sample | N | Mean (J) | Std. Dev. | 95% CI | |
|---|---|---|---|---|---|
| Comparative | 5 | 0.10395 | 0.0146 | 0.09025 | 0.11766 |
| Example 1 | 5 | 0.5372 | 0.0264 | 0.5235 | 0.5509 |
| Example 2A | 5 | 0.19206 | 0.01766 | 0.17835 | 0.20576 |
| Example 3A | 5 | 0.13883 | 0.00295 | 0.12513 | 0.15254 |
| Example 3B | 5 | 0.12343 | 0.00343 | 0.10973 | 0.13714 |
| Example 4 | 5 | 0.16835 | 0.00889 | 0.15465 | 0.18206 |

TABLE 2

ANOVA testing of energy dissipation data indicates that differences among the samples are statistically significant.

| Source | DF | Adj. SS | Adj. MS | F-Value | P-Value |
|---|---|---|---|---|---|
| Sample | 5 | 0.664598 | 0.13292 | 602.69 | 0 |
| Error | 24 | 0.005293 | 0.000221 | | |
| Total | 29 | 0.669891 | | | |

TABLE 3

Post hoc comparison of mean energy dissipation. Post hoc analysis was conducted using the Tukey-Kramer procedure. Samples which are statistically different do not share a grouping letter (e.g., A and AB would NOT be statistically different since they share the letter A).

| Sample | N | Mean (J) | Grouping |
|---|---|---|---|
| Example 1 | 5 | 0.5372 | A |
| Example 2A | 5 | 0.19206 | B |
| Example 4 | 5 | 0.16835 | B |
| Example 3A | 5 | 0.13883 | C |
| Example 3B | 5 | 0.12343 | C D |
| Comparative | 5 | 0.10395 | D |

TABLE 4

Summary of peak force for each film sample.

| Sample | N | Mean (N) | Std. Dev. | 95% CI | |
|---|---|---|---|---|---|
| Comparative | 5 | 41.63 | 3.24 | 37.34 | 45.92 |
| Example 1 | 5 | 63.204 | 2.061 | 58.913 | 67.494 |
| Example 2A | 5 | 60.44 | 2.64 | 56.15 | 64.73 |
| Example 3A | 5 | 120.92 | 6.06 | 116.63 | 125.21 |
| Example 3B | 5 | 163.45 | 8.36 | 159.16 | 167.74 |
| Example 4 | 5 | 50.544 | 1.118 | 46.253 | 54.834 |

TABLE 5

ANOVA testing of peak force data indicates that differences among the samples are statistically significant.

| Source | DF | Adj. SS | Adj. MS | F-Value | P-Value |
|---|---|---|---|---|---|
| Sample | 5 | 57872 | 11574.4 | 535.67 | 0 |
| Error | 24 | 518.6 | 21.6 | | |
| Total | 29 | 58390.6 | | | |

TABLE 6

Post hoc comparison of mean peak force. Post hoc analysis was conducted using the Tukey-Kramer procedure. Samples which are statistically different do not share a grouping letter (e.g., A and AB would NOT be statistically different since they share the letter A).

| Sample | N | Mean (N) | Grouping |
|---|---|---|---|
| Example 3B | 5 | 163.45 | A |
| Example 3A | 5 | 120.92 | B |
| Example 1 | 5 | 63.204 | C |
| Example 2A | 5 | 60.44 | C |
| Example 4 | 5 | 50.544 | D |
| Comparative | 5 | 41.63 | D |

Explanation of Results:

Impact puncture properties of the provided film samples were measured following the guidelines of ASTM D3763-14. The test describes a falling dart impact test, from which the peak impact force and the work done by the film on the impactor (a measure of how much impact energy the films absorbs) can be computed. The concept of the test is to impact the film with a sufficiently energetic mass that the impact does not significantly slow down the impactor (less than 20% slow down). An impactor of 7.095 kg and an impact velocity of 200 m/min. were selected to meet this criteria.

Differences in impact energy dissipated were observed among the samples (Table 1), with Example 1 exhibiting the highest level of dissipation. Differences were statistically significant (Table 2), and differences between specific pairs of samples were also statistically significant (Table 3). A higher energy of dissipation indicates that the film can absorb more energy before failure. Failure was estimated as the point of maximum force.

The ability to absorb a higher level of energy does not indicate that the peak force due to an impact will be larger. Peak impact force is determined by a combination of impactor energy and the composite stiffness of the impactor and material tested. Higher peak loads may be due to a stiffer but less tough material. In such a circumstance, the maximum deformation would be lower, resulting in an overall lower amount of mechanical work done on the probe before failure. This phenomena was observed with the sample tested here.

Differences in peak force were observed among the samples (Table 4), with Example 3B yielding the largest peak force. These differences were statistically significant (Table 5), and differences between individual pairs of samples were also significant (Table 6). Example 3B was also tied for the lowest impact energy dissipation. Therefore, Example 3B is the strongest sample, but it is one of the least tough. Conversely, Example 1 is the toughest sample, but it only exhibits moderate strength in comparison to Example 3B.

Depending on the characteristics desired from the film, either metric of puncture resistance may be more desirable. The large impact strength is able to withstand larger loads; however, the elevated toughness is generally more resistant to puncture as any puncturing object would need to be pushed further into the film to cause tearing.

Modification of Standard Test Method/Sample Preparation Method:

Impact puncture properties were assessed following ASTM D3763-14. This technique describes a falling dart drop tower with a 12.70±0.13 mm hemispherical probe which strikes a film uniformly clamped over a 76.0±3.0 mm hole. The probe is instrumented with a load cell with a sufficiently high sampling rate and natural frequency to record the impact forces of the falling probe (see Table 7 for specific instrumentation).

TABLE 7

Specific instrumentation employed for testing.

| Component | Value |
|---|---|
| Load Cell | Kistler 9212 charge mode piezoelectric |
| Charge Amplifier | Kistler 5010 |
| Data Acquisition System | National Instruments 9234 & LabVIEW |
| Drop Tower | Instron Dynatup 8200 |
| Impactor mass | 7.095 kg |
| Target impact velocity | 200 m/min. |

From the force and mass of the falling probe, it is possible to compute the displacement of the film with time (procedure described in standard). The integral under the force-displacement curve is the work done by the film on the probe, which represents how much of the energy of the impact is absorbed by the film. According to the standard, the work should be computed at a specified point in the load history. For purposes of this work, the integral was taken from the first instance of loading up to the peak force. Integrals were computed using the trapezoidal method implement in Microsoft™ Excel.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A multilayer film comprising:
   (a) two or more non-plasticized layers comprising lactic acid polymer; and
   (b) one or more plasticized layers consisting of amorphous lactic acid polymer, crystalline lactic acid polymer, plasticizer and optionally colorant sandwiched between the two or more lactic acid polymer layers;
   wherein the thickness of the one or more plasticized layers comprises from about 60% to about 70% of the total thickness of the multilayer film.

2. The multilayer film of claim 1 wherein the thickness of the one or more plasticized layers comprises from about 65% to about 68% of the total thickness of the multilayer films.

3. The multilayer film of claim 1 wherein the plasticizer is a bio-based plasticizer.

4. The multilayer film of claim 1 wherein the multilayer film comprises only bio-based polymers.

5. The multilayer film of claim 1 wherein the multilayer film is biodegradable.

6. The multilayer film of claim 1 wherein the one or more plasticized layers comprises from about 22.5 wt. % to about 25 wt. % plasticizer.

7. The multilayer film of claim 6 wherein the plasticizer is a bio-based plasticizer.

8. The multilayer film of claim 6 wherein the multilayer film comprises only bio-based polymers.

9. The multilayer film of claim 6 wherein the multilayer film is biodegradable.

10. The multilayer film of claim 1 wherein the one or more non-plasticized layers further comprise starch, said starch being selected from acid-treated starch, alkaline-treated starch, bleached starch, oxidized starch, enzyme-treated starch, monostarch phosphate, distarch phosphate, phosphated distarch phosphate, acetylated distarch phosphate, starch acetate, acetylated distarch adipate, dextrin, cyclodextrin, hydroxypropyl starch, hydroxypropyl 15 distarch phosphate, hydroxypropyl distarch glycerol, starch sodium octenyl succinate, acetylated oxidized starch, and combinations thereof.

* * * * *